United States Patent [19]
Lautzenhiser et al.

[11] Patent Number: 5,524,490
[45] Date of Patent: Jun. 11, 1996

[54] INDUCTIVE PROXIMITY SENSOR

[75] Inventors: Frans P. Lautzenhiser, Noblesville; Dwadasi H. R. Sarma, Kokomo, both of Ind.

[73] Assignee: Delco Electronics Corporation, Kokomo, Ind.

[21] Appl. No.: 533,022

[22] Filed: May 25, 1995

Related U.S. Application Data

[63] Continuation of Ser. No. 248,913, May 25, 1994, abandoned.

[51] Int. Cl.⁶ .......................... G01P 15/00; G01P 15/08
[52] U.S. Cl. ........................ 73/514.160; 73/514.31; 324/207.16; 324/207.17; 336/200; 336/232
[58] Field of Search .................. 73/514.160, 514.31, 73/760, 763; 336/30, 200, 232; 324/207.15, 207.16, 207.26

[56] References Cited

U.S. PATENT DOCUMENTS

| | | | |
|---|---|---|---|
| 2,283,277 | 5/1942 | Modine | 324/207.26 |
| 3,691,497 | 9/1972 | Bailey et al. | 336/192 |
| 3,777,255 | 12/1973 | Young et al. | 324/34 PS |
| 3,849,724 | 11/1974 | Ghibu et al. | 324/34 D |
| 4,271,763 | 6/1981 | Berger | 324/207.26 |
| 4,503,922 | 3/1985 | Brosh et al. | 324/207.16 |
| 4,553,040 | 11/1985 | Trüper et al. | 307/116 |
| 4,613,843 | 9/1986 | Esper et al. | 336/232 |
| 5,107,708 | 4/1992 | Seipler et al. | 73/517 R |
| 5,159,347 | 10/1992 | Osterwalder | 343/787 |
| 5,161,414 | 11/1992 | Rubbelke | 73/658 |
| 5,194,805 | 3/1993 | Nakajima et al. | 324/207.16 |
| 5,250,897 | 10/1993 | DiIorio | 324/207.16 |
| 5,277,064 | 1/1994 | Knigga et al. | 73/517 R |

Primary Examiner—Hezron E. Williams
Assistant Examiner—Richard A. Moller
Attorney, Agent, or Firm—Mark A. Navarre

[57] ABSTRACT

An inductive sensing element for sensing displacement of a resilient flexible beam or diaphragm. The inductive sensing element comprises an open faced member and a closed faced member one of which is attachable to the flexible beam and the other of which is attachable to a stationary member. The parameters of both the open and closed faced members are selected so that the self-inductance of the open faced member is determined by the overall distance separating the members. Both the open and closed faced members have a magnetic coating and the open face member further comprises an electrically conductive coating arranged in a predetermined pattern on its magnetic coating. The self-inductance of the open faced member, in particular, the predetermined pattern, is dependent upon the magnetic coating on the open faced member and the magnetic contribution that the magnetic coating of the closed faced member makes to the magnetic coating of the open faced member which, in turn, is dependent upon the overall distance separating the open and closed faced members.

2 Claims, 3 Drawing Sheets

INDUCTIVE PROXIMITY SENSOR

This is a continuation of application Ser. No. 08/248,913 filed on May 25, 1994 now abandoned.

TECHNICAL FIELD

The present invention relates to a sensor, particularly suited for vehicles, for measuring displacement between movable and stationary members. More particularly, the present invention relates to an inductive sensor for sensing the displacement between a flexible alumina beam and a stationary frame. Specifically, the present invention relates to an inductive sensor comprising two components each having a magnetic coating on a respective matching surface and whose separation therebetween establishes the self-inductance of the inductive sensor.

BACKGROUND OF THE INVENTION

Automotive systems are increasing the employment of sensing devices, such as those used in accelerometers. The sensing devices are now found in various automotive systems including vehicle navigation systems, chassis control systems having active suspensions and active rear steering, and an anti-slip regulation system, such as anti-lock braking. One such sensing device is used in an accelerometer described in U.S. patent application Ser. No. 08/038,422, filed Mar. 29, 1993, having Attorney Docket No. G-9949, assigned to the same assignee as the present invention, and which is herein incorporated by reference.

One of the more popular sensing devices is a piezoresistor that finds use in both accelerometers and pressure sensors. For an accelerometer, the piezoresistor, or an array of such elements, may be placed on or in a beam that supports a sensing mass whose displacement, relative to a fixed frame, is indicative of acceleration. The piezoresistors are arranged so as to be subjected to stresses whereby their resistance varies in response to the deflection of the beam which, in turn, is indicative of the displacement to which the sensing mass is being subjected. The piezoresistors, as well as other type sensing element, may be deposited directly onto a substrate preferably formed of alumina which, in turn, may serve as, e.g., a surface of the beam that supports the sensing mass. The sensor assemblies, such as an accelerometer, that incorporate the stress responsive piezoresistors create sites on their substrate which undergo high strain when the sensors are stressed. These highly strained sensor assemblies encounter two intertwined problems. The first of which is that the highly stressed areas, created during intended normal usage, inevitably result in a tendency to break when subjected to high forces. These high forces commonly occur when a sensor assembly is inadvertently dropped causing breakage thereof. The second problem is that when the sensor assembly is highly stressed, in particular the substrate where the piezoresistors are deposited, the material forming the piezoresistance undergoes a change of resistance which is only on the order of 0.1% of its total resistance, thereby, limiting the sensitivity of the device. The overall effect of these two problems is that a sensor assembly using piezoresistors acts as a fragile device that may easily be harmed when placed in an automotive system.

SUMMARY OF THE INVENTION

It is, therefore, a principal object of the present invention to provide sensing elements for sensing assemblies used in automotive systems and that are free of the high stress drawbacks that piezoresistors sensing elements suffer.

Another object of the present invention is to provide sensing elements free of high stress drawbacks that are attachable to or directly deposited on resilient flexible beams and/or stationary members and that provide an electrical signal that is proportional to the displacement of the resilient beam relatively to the stationary member.

It is another object of the present invention to provide sensing elements, free of high stress drawbacks, that develop an electrical signal which may be used to derive linear acceleration, rotational acceleration, and rotational direction information, or in any application where force applied to a sensing element is to be sensed.

A further object of the present invention is to provide a method of fabricating that yields durable yet inexpensive sensing elements.

Other objects of the present invention, as well as advantages thereof over existing prior art forms, will be apparent in view of the following description accompanied by means hereinafter described and claimed.

In general, the sensing element of the present invention is an inductive device comprising two elements that are respectively attached to a flexible beam member and a frame member and whose spacing therebetween determines the self-inductance of one of the elements which, in turn, provides a measurement of the displacement of the flexible beam relative to the frame member.

In one embodiment, the inductive sensing device comprises an open faced member and a closed faced member. The open and closed faced members are respectively attachable to movable and stationary members so as to be initially spaced apart relative to each other to establish a predetermined gap (g) therebetween. Each of the open and closed faced members has a magnetic coating each of which is of a predetermined thickness. The open faced member further has an electrically conductive coating arranged on its magnetic coating and in a predetermined pattern. The predetermined pattern has a self-inductance that is determined by (1) the magnetic coatings of both the open and closed faced members, (2) the predetermined gap (g), and (3) the displacement (d) between the stationary and movable members that occurs when the open and closed faced members are attached thereto and the movable member encounters a change of position therebetween.

In one embodiment, one or more inductive sensing devices are integrated into an accelerometer. The accelerometer further comprises at least one rigid frame having a predetermined plane, at least one resilient beam extending from the rigid frame, and at least one sensing mass supported relative to the frame by the resilient beam. The one or more inductive sensing devices detect the change of position of the sensing mass which change is indicative of acceleration.

DESCRIPTION OF EXEMPLARY EMBODIMENTS

Figure 1:
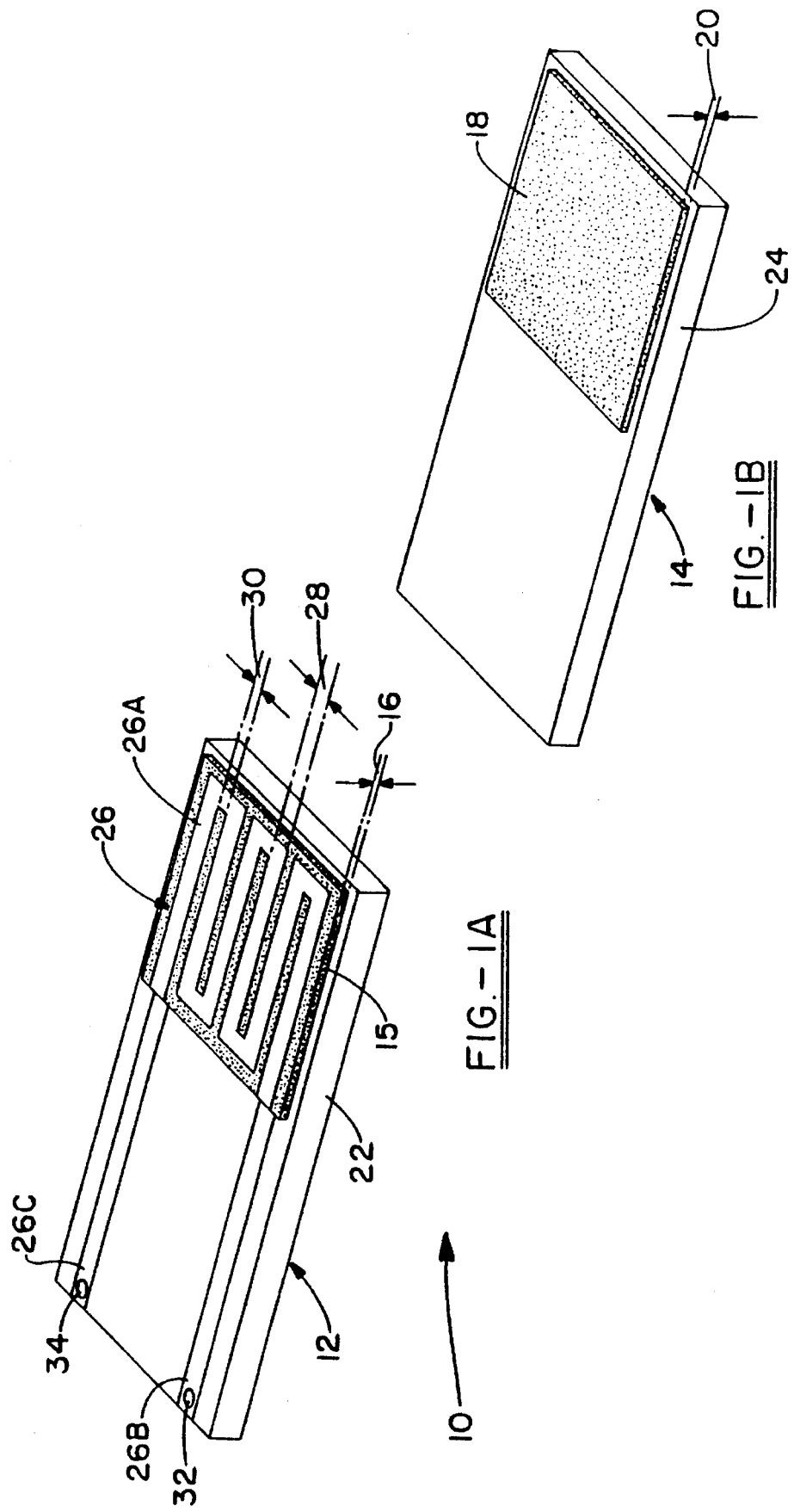
FIG. 1 is comprises FIGS. 1A and 1B which illustrate open and closed faced members respectively of the inductive sensing device of the present invention.

Referring to the drawings, wherein like reference numbers designate like elements, there is shown in FIG. 1 an inductive sensing device 10 comprising an open faced member 12, illustrated in FIG. 1A, and a closed faced member 14, illustrated in FIG. 1B. As used herein, the inductive sensing device 10, sometimes referred to as a sensing element or sometimes referred to in the art as an inductive proximity sensor, provides a sensing function for a sensing assembly, such as an accelerometer. The inductive sensing device 10 operates to measure displacement or a change in position between movable and stationary members. In general, the open and closed face members 12 and 14 of the sensing device 10 are separately attachable to either a resilient-flexible beam or a stationary-frame member. The parameters of both the open and closed faced members are predetermined so that the self-inductance of the open faced member is accurately controlled within a defined range of the distance separating the open and closed faced members.

The open faced member 12 comprises a coating 15 of a magnetically soft material having a predetermined thickness 16 and, similarly, the closed faced member 14 has a coating 18 of a magnetically soft material having a predetermined thickness 20. The coating 15 may be placed on a substrate 22, which preferably comprises alumina, and, similarly, the coating 18 of the open faced member 14 may be placed on a substrate 24 also preferably comprising alumina. Alternatively, and as will be further discussed with reference to an accelerometer shown in FIG. 3, the coatings 15 and 18 may be directly deposited onto a resilient beam member and/or a frame member.

The open faced member 12 of FIG. 1A further comprises an electrically conductive coating 26 formed in a predetermined pattern 26A, sometimes referred to as a meander pattern, that is deposited onto the magnetic coating 15. The predetermined pattern 26A comprises continuous paths each having a predetermined width 28 and which paths are spaced apart from each other by a predetermined distance 30. The winding paths of pattern 26A serve in a manner similar as a coil of wire wound around the core of a transformer that the pattern functions to concentrate magnetic fields and, thus, gives a higher self-inductance than that of a straight electrically conductive coating. Entrance 26B and exit 26C sections of the electrical conductive coating 26 are provided with appropriate terminals 32 and 34 respectively so as to be adapted to be connected to an external electrical circuit, to be described with reference to FIG. 4. As shown in FIG. 1A, the predetermined pattern 26A covers an overall area of the magnetic coating 15 which is at least matched by the overall area of the magnetic coating 18 of the closed faced member 14. More particularly, the magnetic coating 18 covers the predetermined pattern 26A when the open and closed faced members are brought together in a manner to be described hereinafter.

The magnetic coatings 15 and 18, as well as the electrically conductive coating 26, are preferably formed by deposition onto the alumina substrates 22 and 24, respectively by using conventional thick-film deposition techniques which apply an accumulative coating of about one (1) mil or more. The thick-film coating may be accomplished by silk screening, although other techniques could also be used. The silk screening process involved for the magnetic coatings 15 and 18 preferably comprises a sequence of three separate steps, wherein the first step prints a layer of soft magnetic ink, the second step dries the printed-magnetic ink, and the third step fires the dried-printed-magnetic ink. These three steps are repeated until a desired thickness of the soft magnetic coating is achieved. Suitable soft magnetic ink is commercially available from Electro-Science Laboratories (ESL), and the desired thickness of each of the magnetic coatings may have a typical thickness of one mil. After the magnetic coating 15 is formed on the open faced member 12, the electrically conductive coating 26, in particular the pattern 26A, is placed onto the coating 15 again preferably in three separate steps. More particularly, first an electrically conductive ink is printed in the meander pattern 26A onto the formed magnetic coating 14, then the electrically conductive ink is dried and, finally, the electrically conductive printed and dried ink is fired. The electrically conductive ink may be of the type DP6160 silver ink commercially available from DuPont Electronics, and the desired thickness of the pattern 26A, as well as the remainder of the electrically conductive coating 26, may have a typical thickness of 0.5 mil.

The desired thickness of the magnetic coatings 15 and 18, should take into account that as the thickness of the magnetic material is increased, the respective inductance of the open faced member is also increased, and, furthermore, the change in the inductance of the sensing device 10, for a given change in the separation (to be described) between the open and closed faced members 12 and 14, is also increased. However, the number of printing steps involved for increasing the thickness of the magnetic coating also increases and with it the cost of the inductive sensing device 10. Further, the stepdown, over which the conductors 26B and 26C are printed from the surface of the magnetic coating 15 to the adjacent bare surface of the substrate 22, is higher for increased thicknesses of the magnetic coatings. Therefore, all of the thicknesses for coating 15, 18 and 26 should be selected so as to minimize the unnecessary likelihood of printing and reliability problems. With regard to these conditions, it should be noted that the thickness of the magnetic coatings 15 and 18 need not be matched, and, more particularly, the performance of the inductive sensing device 10 may be optimized when the magnetic coating 18 is thicker than the coating 15. The parameters of the inductive sensing device 10 are selected so that the predetermined pattern 26A has a predetermined self-inductance that is determined by (1) the parameters of magnetic coatings 15 and 18, (2) a predetermined gap (g) between the initial or stationary positions of the operatively attached open and closed faced members and (3) the displacement (d) between stationary and movable members that occurs when the open and closed faced members 12 and 14 are attached thereto and the movable member encounters a change of position. The predetermined gap (g) and the operatively occurring displacement (d) between stationary and movable members may be further described with reference to FIG. 2.

Figure 2:
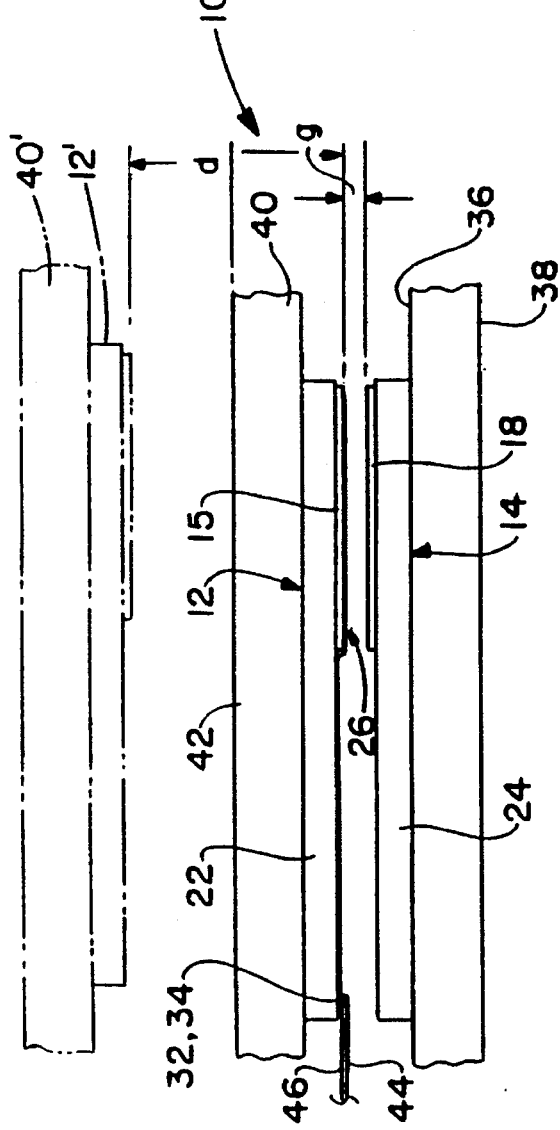
FIG. 2 illustrates the open and closed faced members respectively of FIG. 1 as being attached to a resilient-flexible beam and a stationary frame.

FIG. 2 illustrates the closed face member 14 as being attached to the outer surface 36 of a stationary or rigid frame member 38, whereas the open faced member 12 is illustrated as being attached to a lower surface 40 of a resilient beam member 42 and having electrical conductors 44 and 46 respectively attached to its terminals 32 and 34. Although members 12 and 14 are respectively shown as being attached to the flexible beam 42 and frame 38, these attachments may be reversed and the operation of the present invention will perform equally well. The members 12 and 14 may be attached by a suitable bonding agent which is preferably applied evenly onto the respective flexible beam 42 and frame 38 and is preferably of a silicone adhesive material, such as Dow Corning QX-6265.

FIG. 2 further illustrates the open and closed faced members 12 and 14 as being spaced apart relative to each other so as to have an initial relationship that establishes a predetermined gap (g). FIG. 2 further illustrates that the open and closed faced members 12 and 14 may be linearly displaced from each other by a displacement distance (d). As viewed in FIG. 2, the displaced position is indicated by the phantom representations 12 and 40. The open and closed faced members 12 and 14 are vertically spaced apart relative to each other so as to be placed close enough to one another to establish the predetermined gap (g) and so that the motion of the beam member 42 changes the displacement distance (d) between the open and closed faced members 12 and 14. This change in displacement distance (d) changes the self-inductance of the pattern 26A and which change may be further described with reference back to FIG. 1.

As previously discussed, the predetermined pattern 26A comprises continuous paths having a predetermined width 28 and a predetermined spacing 30 and which have values that are preferably equal to each other so as to establish a herein termed "feature size F."

The feature size F affects the inductance per unit area (L/A) of the pattern 26A, and also affects the change (dL) in inductance for a given change (dS) in the space parameter between the open and closed faced members 12 and 14. This space parameter includes the gap (g) at 48 and displacement distance (d) at 50 both previously described with reference to FIG. 2. For a limited range (r) of the space parameter S=g+d between the open and closed faced members 12 and 14, the inductance L(S) of the sensing device 10 may be expressed by the relationship given below:

$$L_{(S)} = L\infty [1 + B^* e^{-AS}]$$

where L∞ is the inductance of the open faced member 12 when the distance between the faces 12 and 14 is infinity, or more practically more than 10*F, and the terms A and B are constants for the device determined by the feature size F, the magnetic properties of the coatings 15, 18, and the thicknesses of coatings 16 and 20.

The limited range (r) in which the relationship of $L_{(S)}$ holds true is equal to the quantity feature size F. Beyond this preferred and limited range (r), the spatial dependence of the quantity L(S) decreases sharply.

In operation, when current is applied to the electrically conductive coating 26, in particular the predetermined pattern 26A, the self-inductance of the pattern 26A is dependent upon an amount of magnetic flux encircling the pattern 26A which, in turn, is dependent upon the parameters of the magnetic coating 15 and 18 and, more importantly, the spacing ((g) and (d)) between the open and closed faced members 12 and 14. The self-inductance of the predetermined pattern 26A determines the inductance $L_{(S)}$ of the inductive sensing device 10.

It should now be appreciated that the practice of the present invention provides for an inductive sensing device 10 having an inductance L(S) that varies with the spacing between the open and closed faced members 12 and 14 so that the inductive sensing device 10 may be used to detect linear displacement between a flexible beam and a frame member. The inductive sensing device 10 may also find application as a sensing element for an accelerometer 52, which may be further described with reference to FIG. 3.

Figure 4:
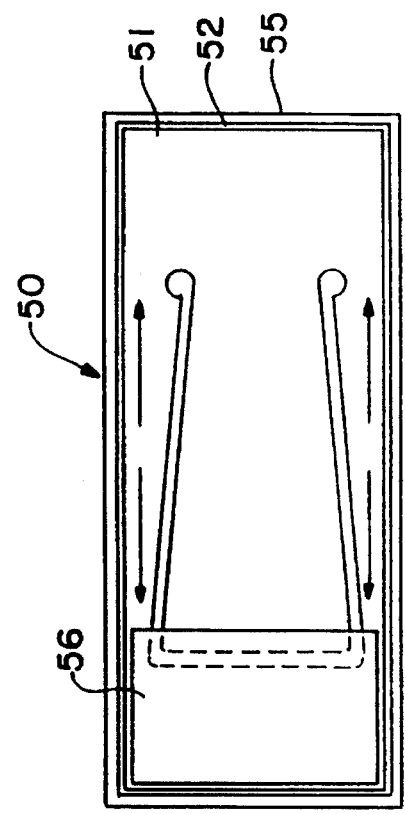
FIGS. 3 and 4 illustrate side and top views respectively of an accelerometer employing the inductive sensing device of the present invention.
Figure 3:
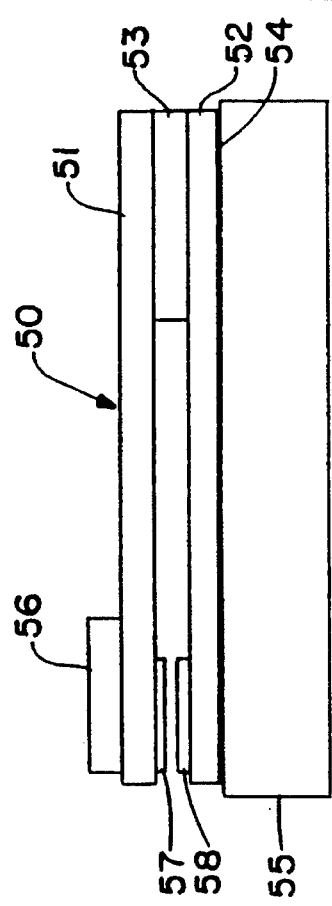
Figure 5:
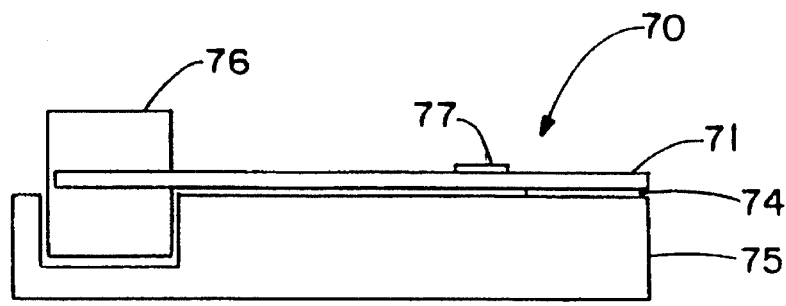
FIGS. 5 and 6 illustrate side and top views respectively of an accelerometer employing the teachings of copending application Ser. No. 08/038,422, filed Mar. 29, 1993.
Figure 6:
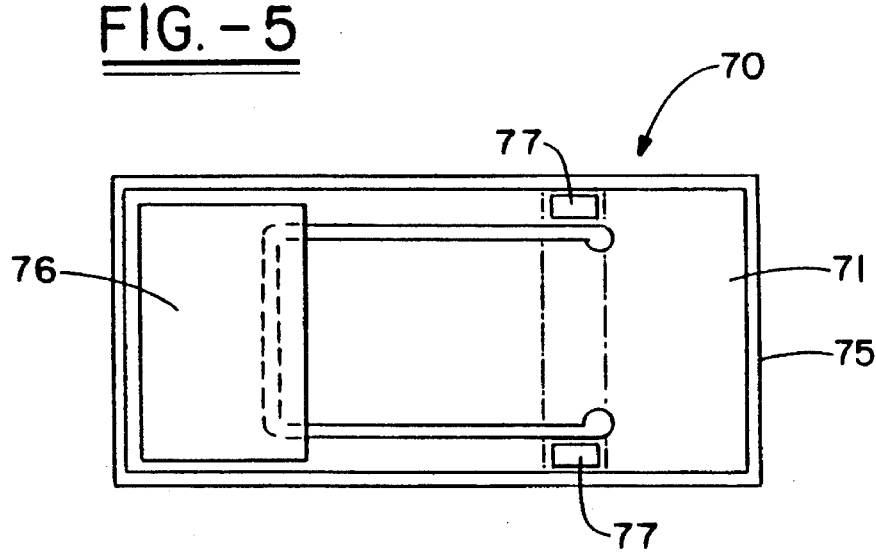

FIGS. 3 and 4 present an accelerometer 50 made in accordance with the instant invention, while FIGS. 5 and 6 present an accelerator 70 made in accordance with the teachings of the aforementioned pending U.S. patent application Ser. No. 08/038,422, filed Mar. 28, 1993. As shown the accelerometer 50 of the present invention does not use the piezoresistor sensors 77 of the copending application which suffer from the stress related drawbacks described earlier herein, but rather uses the inductive sensing device 10 of the present invention. Furthermore, the inductive sensing device 10 is placed onto the accelerometer 50 so that the open or close faced member 58 is rigidly attached to a rigid frame member 52 and so that the other open faced member 57 is rigidly attached to a resilient beam 51. For such an arrangement, the backplate 75, requires modification and such a modification is within the skill of those in the art. Still further, if desired, the coatings 15 and 18, described with reference to FIG. 1, may be directly deposited onto the respective surface of the frame member 52 and the resilient beam 51, in a manner similar to that described for the piezoresistor sensor of the copending application.

Other than the above described differences and modifications, one or more inductive sensing devices 10 may be used in place of the one or more piezoresistor sensors 77 and the accelerometer 50 of the present invention will perform in a similar manner as described for the accelerometer 70. Although the flexible beam 51 still requires motion like the flexible beam 71, unlike the piezoresistor sensor 70, the inductive sensing device 50 has no need to localize stress in order to measure deflection of the flexible beam 51 relative to the fixed frame 55. The elimination of the localized stress zone of the accelerometer 70 (shown in FIG. 6) improves the durability of the sensor element such as inductive sensing device 10. More particularly, any stress that may occur during operation may now be evenly distributed along the length of the beam (shown in FIG. 4) allowing for a rugged inductive sensing device 10 of the present invention.

In general, the support member 71 of the accelerometer serves as a resilient beam member extending from the fixed frame member 75 and the sensing mass 76 serves as a mass that is subjected to acceleration. The inductive sensing device detects displacement of the sensing mass 56 which corresponds to changes in the gap between the open and close faces 57 and 58. The one or more inductive sensing devices 10, integrated onto accelerometer 50, provide appropriate indications which may be used to derive acceleration. Each of the inductive sensing devices 10 provides inductive-type signals which may be measured by an appropriate inductive bridge 54 such as that described with reference to FIG. 7.

Figure 7:
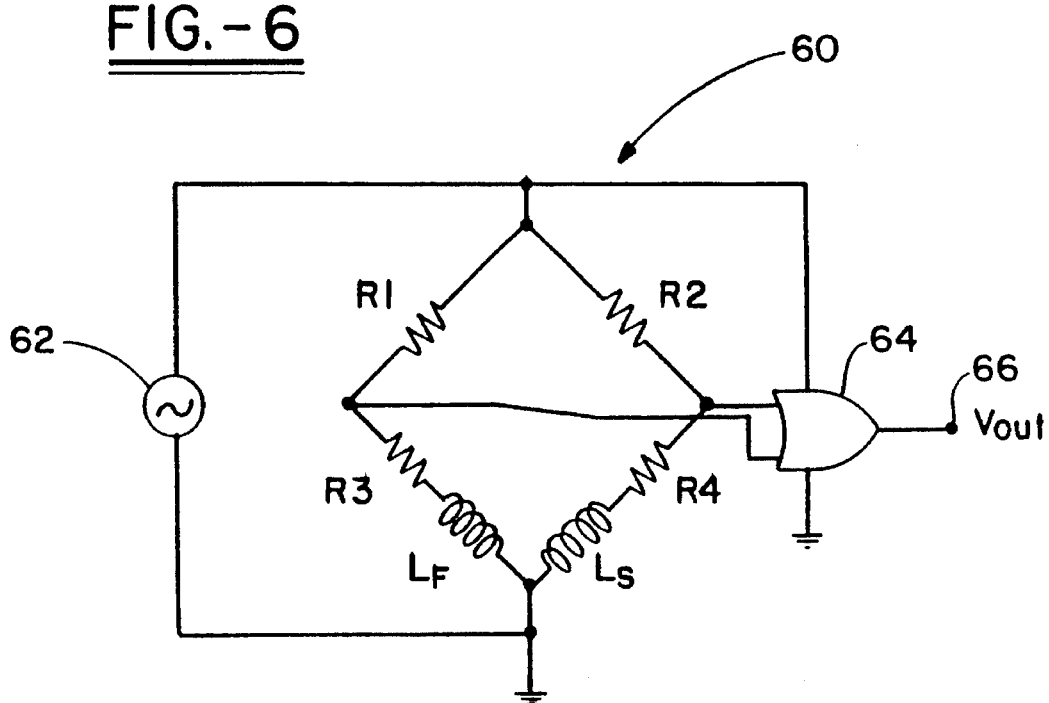
FIG. 7 is a schematic illustration of an inductive bridge circuit having the inductive sensing device of the present invention forming one of its legs.

FIG. 7 illustrates the inductive bridge 60 as having an AC voltage source 62 applied thereto. The inductive bridge is arranged in a well-known manner, as shown in FIG. 7 and comprises a plurality of elements having a reference number/letter given in Table 1.

TABLE 1

| REFERENCE NO. | DESCRIPTIVE |
| --- | --- |
| R1 | Fixed Resistor |
| R2 | Fixed Resistor |
| R3 | Fixed Resistor |
| R4 | Fixed Resistor |
| $L_F$ | Fixed Inductor |

TABLE 1-continued

| REFERENCE NO. | DESCRIPTIVE |
|---|---|
| $L_s$ | Inductance of the Inductive Sensing Device 10 |
| 64 | Phase-Sensitive Detector |

In operation, a DC balance exists when the below relationship is satisfied:

$$R_1R_4=R_2R_3$$

Similarly, an AC balance exists when the below following relationship is satisfied:

$$R_1L_{(S)}=R_2L_F$$

The output of the circuit arrangement 60 is a DC voltage 66 ($V_{out}$) that varies with the inductance $L_{(S)}$ of the inductive sensing device 10 in accordance with the relationship given below:

$$V_{out}=V_o+a[L_{(S)}-L_F]$$

where $a=\omega A$ and $\omega=2\pi f$, A=amplifier gain of phase-sensitive detector 58, and f is the frequency of the AC voltage source 56.

The output signal ($V_{out}$) of FIG. 7, derived from the information yielded by the inductive sensing device 10, is similar to the output signals of the resistance bridges of FIGS. 6A, 6B and 6C described in the earlier referenced copending application, and such an output signal ($V_{out}$) may be further processed to derive rotational acceleration which, in turn, may be further conditioned by the integrating circuits shown in FIGS. 6A, 6B and 6C to derive the rotational rate and rotational direction information. Of course, and as presented above, other applications such as the derivation of linear acceleration or any other suitable determination can be made.

It should now be appreciated that the practice of the present invention provides for an inductive sensing device 10 that provides an inductive quantity that may be utilized by signal conditioning and processing circuits to derive acceleration related information that is particularly suited for use in automotive systems.

It should be further appreciated that although the hereinbefore given descriptions of the inductive sensing device of the present invention have been primarily described for vehicle applications, it should be recognized that the inductive sensing device, as well as the sensor assemblies, such as the accelerometer, related to the present invention may be used for measuring displacement and acceleration related information for various domestic, commercial and industrial applications.

We claim:

1. A sensor for measuring a distance between first and second members mutually secured to a support element to establish a nominal distance therebetween, said sensor comprising an open faced member attached to a surface of said first member which faces said second member and a closed faced member attached to a surface of said second member which faces said first member, said open faced and closed faced members each being coated with a predetermined thickness of magnetic material, and a thick film conductor formed on the magnetic material coating said open faced member, said thick film conductor being formed in a meander pattern, resulting in a self-inductance that is determined by (1) said magnetic coatings, (2) said nominal distance and (3) movement of said first and second members which changes said nominal distance.

2. The sensor of claim 1, wherein the predetermined meander pattern of the thick film conductor formed on the magnetic material coating said open faced member is a winding continuous conductive path of predetermined width, with a predetermined spacing between adjacent paths.

* * * * *